US012562496B2

(12) United States Patent
Shahvirdi Dizaj Yekan et al.

(10) Patent No.: US 12,562,496 B2
(45) Date of Patent: Feb. 24, 2026

(54) META-STRUCTURE BASED REFLECTARRAYS FOR ENHANCED WIRELESS APPLICATIONS

(71) Applicant: BDCM A2 LLC, Dover, DE (US)

(72) Inventors: Taha Shahvirdi Dizaj Yekan, San Diego, CA (US); Maha Achour, Encinitas, CA (US)

(73) Assignee: BDCM A2 LLC, Dover, DE (US)

( * ) Notice: Subject to any disclaimer, the term of this patent is extended or adjusted under 35 U.S.C. 154(b) by 369 days.

(21) Appl. No.: 17/678,000

(22) Filed: Feb. 22, 2022

(65) Prior Publication Data

US 2022/0181786 A1 Jun. 9, 2022

Related U.S. Application Data

(63) Continuation of application No. 16/551,361, filed on Aug. 26, 2019, now Pat. No. 11,258,182.

(Continued)

(51) Int. Cl.
*H01Q 15/14* (2006.01)
*H01Q 1/42* (2006.01)
(Continued)

(52) U.S. Cl.
CPC ............ *H01Q 15/141* (2013.01); *H01Q 1/42* (2013.01); *H01Q 1/44* (2013.01); *H01Q 3/20* (2013.01);
(Continued)

(58) Field of Classification Search
CPC .. H01Q 1/42; H01Q 1/44; H01Q 3/20; H01Q 15/0086; H01Q 15/141; H01Q 15/147; H01Q 15/16; H01Q 15/23
See application file for complete search history.

(56) References Cited

U.S. PATENT DOCUMENTS 6,222,503 B1 * 4/2001 Gietema .................. H01Q 1/44 343/890
8,059,048 B2 * 11/2011 Felstead .................. H01Q 3/08 343/766

(Continued)

FOREIGN PATENT DOCUMENTS

CN 203119090 U 8/2013

OTHER PUBLICATIONS

H. Yamada, et al., "Circular Polarization Conversion Reflectarray Suppressing Beam Shift," in 2019 IEEE International Symposium on Antennas and Propagation and USNC-URSI Radio Science Meeting, Atlanta, GA, Jul. 2019, pp. 299-300.

(Continued)

*Primary Examiner* — Amal Patel
(74) *Attorney, Agent, or Firm* — Dinsmore & Shohl LLP

(57) ABSTRACT

Examples disclosed herein relate to reflectarray antenna for enhanced wireless applications. The reflectarray antenna has a ground conductive plane, a dielectric substrate coupled to the ground conductive plane, and a patterned conductive plane coupled to the dielectric substrate and comprising an array of cells to generate an antenna gain. In some aspects, each cell in the array of cells includes a reflector element with a predetermined custom configuration and configured to receive a radio frequency (RF) signal and to generate an RF return beam at a predetermined direction. Other examples disclosed herein relate to a portable reflectarray and a method of fabricating a reflectarray antenna.

11 Claims, 20 Drawing Sheets

Related U.S. Application Data

(60) Provisional application No. 62/855,688, filed on May 31, 2019.

(51) Int. Cl.

| | |
|---|---|
| ***H01Q 1/44*** | (2006.01) |
| ***H01Q 3/20*** | (2006.01) |
| ***H01Q 15/00*** | (2006.01) |
| ***H01Q 15/16*** | (2006.01) |
| ***H01Q 15/23*** | (2006.01) |

(52) U.S. Cl.
CPC ....... *H01Q 15/0086* (2013.01); *H01Q 15/147* (2013.01); *H01Q 15/16* (2013.01); *H01Q 15/23* (2013.01)

(56) References Cited

U.S. PATENT DOCUMENTS

| | | | | |
|---|---|---|---|---|
| 8,319,698 | B2 | 11/2012 | Legay et al. | |
| 9,112,281 | B2 * | 8/2015 | Bresciani | H01Q 19/10 |
| 11,177,577 | B2 * | 11/2021 | Yemelong | H04B 7/145 |
| 2009/0079645 | A1 * | 3/2009 | Sotelo | H01Q 15/0046 343/912 |
| 2010/0097290 | A1 | 4/2010 | Legay et al. | |
| 2015/0102973 | A1 | 4/2015 | Hand et al. | |
| 2018/0166781 | A1 * | 6/2018 | Snyder | H01Q 21/08 |
| 2019/0067826 | A1 | 2/2019 | Achour et al. | |
| 2020/0091613 | A1 | 3/2020 | David et al. | |

OTHER PUBLICATIONS

T. Yekan, et al., "Design of Two Transparent X Band Reflectarray Antennas Integrated on a Satellite Panel," in 2016 IEEE International Symposium on Antennas and Propagation (APSURSI), Fajardo, PR, Jun. 2016, pp. 1413-1414.

T. Yekan, et al., "Examination of Two Types of Quasi Transparent Reflectarray Elements," in 2016 IEEE International Symposium on Antennas and Propagation (APSURSI), Fajardo, PR, Jun. 2016, pp. 1543-1544.

T. Yekan, et al., "Conformal Integrated Solar Panel Antennas: Two Effective Integration Methods of Antennas With Solar Cells.," in IEEE Antennas and Propagation Magazine, vol. 59, No. 2, pp. 69-78, Apr. 2017.

T. Yekan, et al., "Transparent Reflectarray Antenna Printed on Solar Cells," in 2016 IEEE 43rd Photovoltaic Specialists Conference (PVSC), Portland, OR, 2016, pp. 2610-2612.

S. Kausar, et al., "Design of High Gain Low Cost Beam-Steering Reflectarray Antenna," in 2019 IEEE International Symposium on Antennas and Propagation and USNC-URSI Radio Science Meeting, Atlanta, GA, Jul. 2019, pp. 315-316.

G.-B. Wu, et al., "Millimeter-Wave Filtering Reflectarray for High-Gain Antenna Applications," in 2019 IEEE International Symposium on Antennas and Propagation and USNC-URSI Radio Science Meeting, Atlanta, GA, USA, Jul. 2019, pp. 1493-1494.

M. Zhou, et al., "Tx/Rx Reflectarray for Multiple Spot Beam Applications in Ka-band," in 2019 IEEE International Symposium on Antennas and Propagation and USNC-URSI Radio Science Meeting, Atlanta, GA, USA, Jul. 2019.

A. Freni, et al., "Analysis and Design of a High-Gain Folded Reflectarray with Curved Polarizer," in 2018 IEEE International Symposium on Antennas and Propagation and USNC-URSI Radio Science Meeting, Boston, MA, USA, Jul. 2018.

E. Martinez-de-Rioja, et al., "3-D Bifocal Design Method for Dual-Reflectarray Configurations With Application to Multibeam Satellite Antennas in Ka-Band," IEEE Transactions on Antennas and Propagation, vol. 67, No. 1, pp. 450-460, Jan. 2019.

D.M. Pozar, et al., "A Shaped-Beam Microstrip Patch Reflectarray," IEEE Transactions on Antennas and Propagation, vol. 47, No. 7, pp. 1167-1173, Jul. 1999.

J. Li, et al., "Amplitude Controlled Reflectarray Using Non-uniform FSS Reflection Plane," in 2011 IEEE International Symposium on Antennas and Propagation (APSURSI), Spokane, WA, Aug. 2011, pp. 2180-2183.

E. Martinez-de-Rioja, et al., "Bifocal Design Procedure for Dual-Reflectarray Antennas in Offset Configurations," IEEE Antennas and Wireless Propagation Letters, vol. 17, No. 8, pp. 1421-1425, Aug. 2018.

S. M. Mousavi, et al., "Bowl-Shaped Beam Reflectarray Antenna for Satellite Communication," in The 8th European Conference on Antennas and Propagation (EuCAP 2014), The Hague, Netherlands, Apr. 2014, pp. 1948-1949.

E. Carrasco, et al., "Demonstration of a Shaped Beam Reflectarray Using Aperture-Coupled Delay Lines for LMDS Central Station Antenna," IEEE Transactions on Antennas and Propagation, vol. 56, No. 10, pp. 3103-3111, Oct. 2008.

G. Carluccio, et al., "Design and Manufacture of Cosecant-Squared Complementary Reflectarrays for Low-Cost Applications," IEEE Transactions on Antennas and Propagation, vol. 65, No. 10, pp. 5220-5227, Oct. 2017.

E. Carrasco, et al., "Design, Manufacture and Test of a Low-Cost Shaped-Beam Reflectarray Using a Single Layer of Varying-Sized Printed Dipoles," IEEE Transactions on Antennas and Propagation, vol. 61, No. 6, pp. 3077-3085, Jun. 2013.

Taha Shahvirdi Dizaj Yekan, "Transparent Solar Panel Antenna Array," Ph.D. dissertation, Dept. of Electrical and Computer Engineering, Utah State University, Logan, UT, Sep. 2016.

E. Choi, et al., "W-band Dual-Large-Reflectarray Antenna with Low Sensitivity and Broad Bandwidth Characteristic," in 2019 URSI International Symposium on Electromagnetic Theory (EMTS), San Diego, CA, May 2019.

D.R. Prado, et al., "Efficient Crosspolar Optimization of Shaped-Beam Dual-Polarized Reflectarrays Using Full-Wave Analysis for the Antenna Element Characterization," IEEE Transactions on Antennas and Propagation, vol. 65, No. 2, pp. 623-635, Feb. 2017.

D.R. Prado, et al., "Efficient Shaped-Beam Reflectarray Design Using Machine Learning Techniques," in 2018 48th European Microwave Conference (EuMA), Madrid, Sep. 2018, pp. 1545-1548.

D.R. Prado, et al., "Fast and Accurate Modeling of Dual-Polarized Reflectarray Unit Cells Using Support Vector Machines," IEEE Transactions on Antennas and Propagation, vol. 66, No. 3, pp. 1258-1270, Mar. 2018.

J.A. Zornoza, et al., "Folded Multilayer Microstrip Reflectarray With Shaped Pattern," IEEE Transactions on Antennas and Propagation, vol. 54, No. 2, pp. 510-518, Feb. 2006.

J. Shaker, et al., "Investigation of FSS-Backed Reflectarray Using Different Classes of Cell Elements," IEEE Transactions on Antennas and Propagation, vol. 56, No. 12, pp. 3700-3706, Dec. 2008.

G.-B. Wu, et al., "Nonuniform FSS-Backed Reflectarray With Synthesized Phase and Amplitude Distribution," IEEE Transactions on Antennas and Propagation, vol. 66, No. 12, pp. 6883-6892, Dec. 2018.

E.R.F. Almajali, "Reflectarray Antennas: Operating Mechanisms, and Remedies for Problem Aspects," Ph.D. dissertation, School of Electrical Engineering and Computer Science, University of Ottawa, Ottawa, Canada, 2014.

D. Martinez-De-Rioja, et al., "Reflectarray to Generate Four Adjacent Beams per Feed for Multispot Satellite Antennas," IEEE Transactions on Antennas and Propagation, vol. 67, No. 2, pp. 1265-1269, Feb. 2019.

J.A. Encinar, et al., "Three-Layer Printed Reflectarrays for Contoured Beam Space Applications," IEEE Transactions on Antennas and Propagation, vol. 52, No. 5, pp. 1138-1148, May 2004.

A. Tamminen, et al., "Reflectarray Design for 120-GHz Radar Application: Measurement Results," IEEE Transactions on Antennas and Propagation, vol. 61, No. 10, pp. 5036-5047, Oct. 2013.

* cited by examiner

META-STRUCTURE BASED REFLECTARRAYS FOR ENHANCED WIRELESS APPLICATIONS

CROSS-REFERENCE TO RELATED APPLICATIONS

This application claims priority from PCT-Application PCT/US2020/035615, filed on Jun. 1, 2020, and incorporated by reference in its entirety; U.S. Non-Provisional application Ser. No. 16/551,361, filed on Aug. 26, 2019, and incorporated by reference in its entirety; and from U.S. Provisional Application No. 62/855,688, filed on May 31, 2019, and incorporated by reference in its entirety.

BACKGROUND

New generation wireless networks are increasingly becoming a necessity to accommodate user demands. Mobile data traffic continues to grow every year, challenging the wireless networks to provide greater speed, connect more devices, have lower latency, and transmit more and more data at once. Users now expect instant wireless connectivity regardless of the environment and circumstances, whether it is in an office building, a public space, an open preserve, or a vehicle. In response to these demands, new wireless standards have been designed for deployment in the near future. A large development in wireless technology is the fifth generation of cellular communications ("5G") which encompasses more than the current Long-Term Evolution ("LTE") capabilities of the Fourth Generation ("4G") and promises to deliver high-speed Internet via mobile, fixed wireless and so forth. The 5G standards extend operations to millimeter wave bands, which cover frequencies beyond 6 GHz, and to planned 24 GHz, 26 GHz, 28 GHz, and 39 GHz up to 300 GHz, all over the world, and enable the wide bandwidths needed for high speed data communications.

The millimeter wave ("mm-wave") spectrum provides narrow wavelengths in the range of ~1 to 10 millimeters that are susceptible to high atmospheric attenuation and have to operate at short ranges (just over a kilometer). In dense-scattering areas with street canyons and in shopping malls for example, blind spots may exist due to multipath, shadowing and geographical obstructions. In remote areas where the ranges are larger and sometimes extreme climatic conditions with heavy precipitation occur, environmental conditions may prevent operators from using large array antennas due to strong winds and storms. These and other challenges in providing millimeter wave wireless communications for 5G networks impose ambitious goals on system design, including the ability to generate desired beam forms at controlled directions while avoiding interference among the many signals and structures of the surrounding environment.

BRIEF DESCRIPTION OF THE DRAWINGS

The present application may be more fully appreciated in connection with the following detailed description taken in conjunction with the accompanying drawings, which are not drawn to scale and in which like reference characters refer to like parts throughout, and wherein.

DETAILED DESCRIPTION

Meta-Structure based reflectarrays for enhanced wireless applications are disclosed. The reflectarrays are suitable for many different wireless applications and can be deployed in a variety of environments and configurations. In various examples, the reflectarrays are arrays of cells having meta-structure reflector elements that reflect incident radio frequency ("RF") signals in specific directions. A meta-structure, as generally defined herein, is an engineered, non- or semi-periodic structure that is spatially distributed to meet a specific phase and frequency distribution. A meta-structure reflector element is designed to be very small relative to the wavelength of the reflected RF signals. The reflectarrays are able to operate at the higher frequencies required for 5G and other wireless applications, and at relatively short distances. Their design and configuration are driven by geometrical and link budget considerations for a given application or deployment, whether indoors or outdoors.

It is appreciated that, in the following description, numerous specific details are set forth to provide a thorough understanding of the examples. However, it is appreciated that the examples may be practiced without limitation to these specific details. In other instances, well-known methods and structures may not be described in detail to avoid unnecessarily obscuring the description of the examples. Also, the examples may be used in combination with each other.

Figure 1:
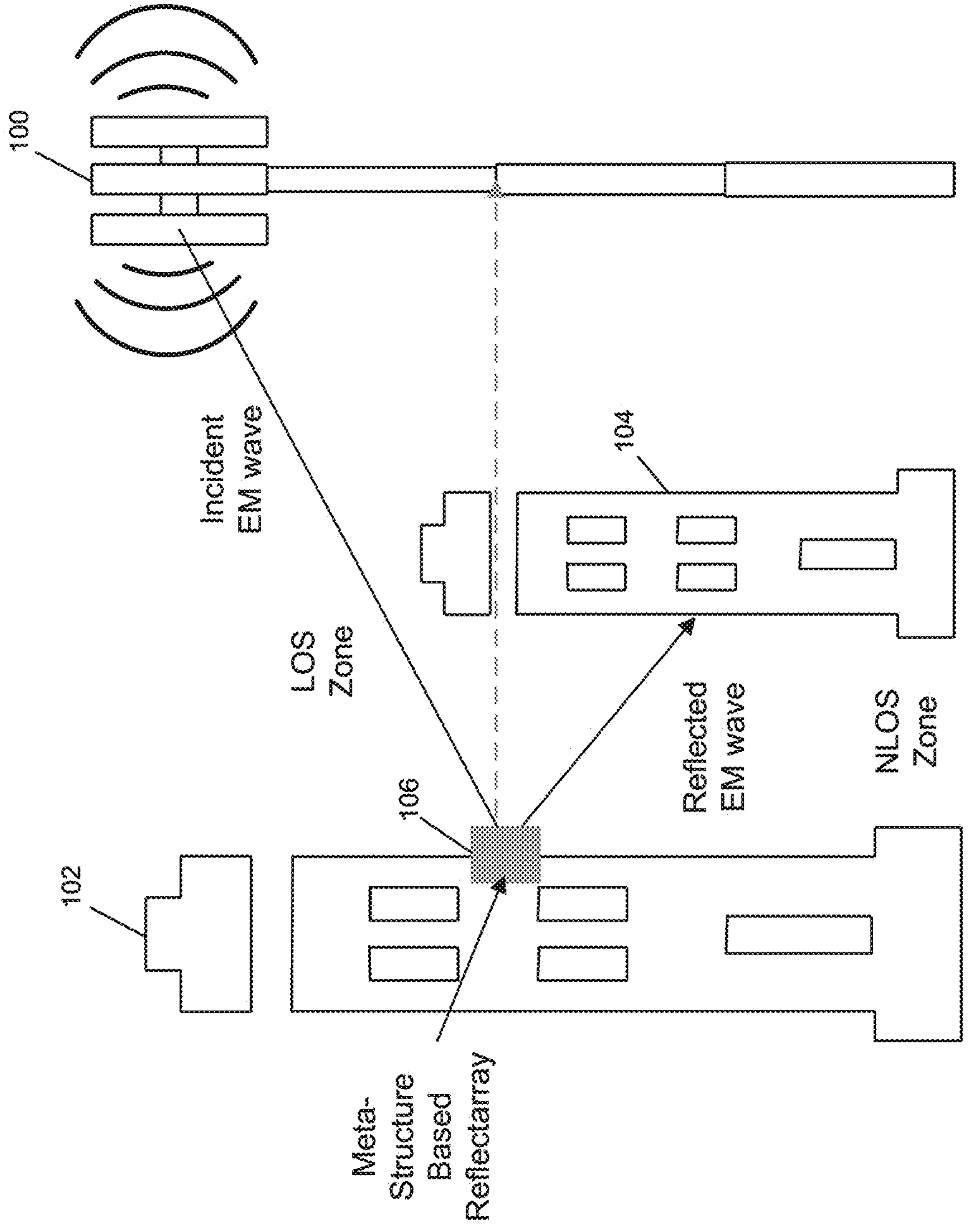
FIG. 1 illustrates an environment in which a meta-structure ("MTS") reflectarray is deployed for 5G applications in accordance to various examples.

FIG. 1 illustrates an environment in which a meta-structure based reflectarray is deployed for wireless applications in according to various examples. Wireless base station ("BS") 100 transmits and receives wireless signals from mobile devices within its coverage area. The coverage area may be disrupted by buildings or other structures in the environment, which may affect the quality of the wireless signals. In the illustrated example, buildings 102 and 104 affect the coverage area of BS 100 such that it has a Line-of-Sight ("LOS") zone. Users of devices outside of this zone may have either no wireless access, significantly reduced coverage, or impaired coverage of some sort. With the high frequency bands used for 5G, it is difficult to expand the coverage area outside the LOS zone of BS 100, and it is expected that the wireless industry will utilize the reflection of radio waves as a solution.

Wireless coverage can be significantly improved to users outside of the LOS zone by the installation of a MTS based reflectarray 106 on a surface of building 102 (e.g., wall, window, etc.) Reflectarray 106 is a robust and low cost relay that is positioned as illustrated between BS 100 and user equipment ("UE") (e.g., a UE in building 104) to significantly improve network coverage. As illustrated, reflectarray 106 is formed, placed, configured, embedded, or otherwise connected to a portion of building 102. Although a single reflectarray 106 is shown for illustration purposes, multiple such reflectarrays may be placed in external and/or internal surfaces of building 102 as desired.

In various examples, reflectarray 106 is able to act as a relay between BS 100 and users within or outside of its LOS zone. Users in a Non-Line-of-Sight ("NLOS") zone are able to receive wireless signals from the BS 100 that are reflected off the reflectarray 106. Various configurations, shapes, and dimensions may be used to implement specific designs and meet specific constraints. The reflectarray 106 can be designed to directly reflect the wireless signals from BS 100 in specific directions from any desired location in the illustrated environment, be it in a suburban quiet area or a high traffic, high density city block. Use of a reflectarray such as reflectarray 106 and designed as disclosed herein can result in a significant performance improvement of even 10 times current 5G data rates.

Figure 2:
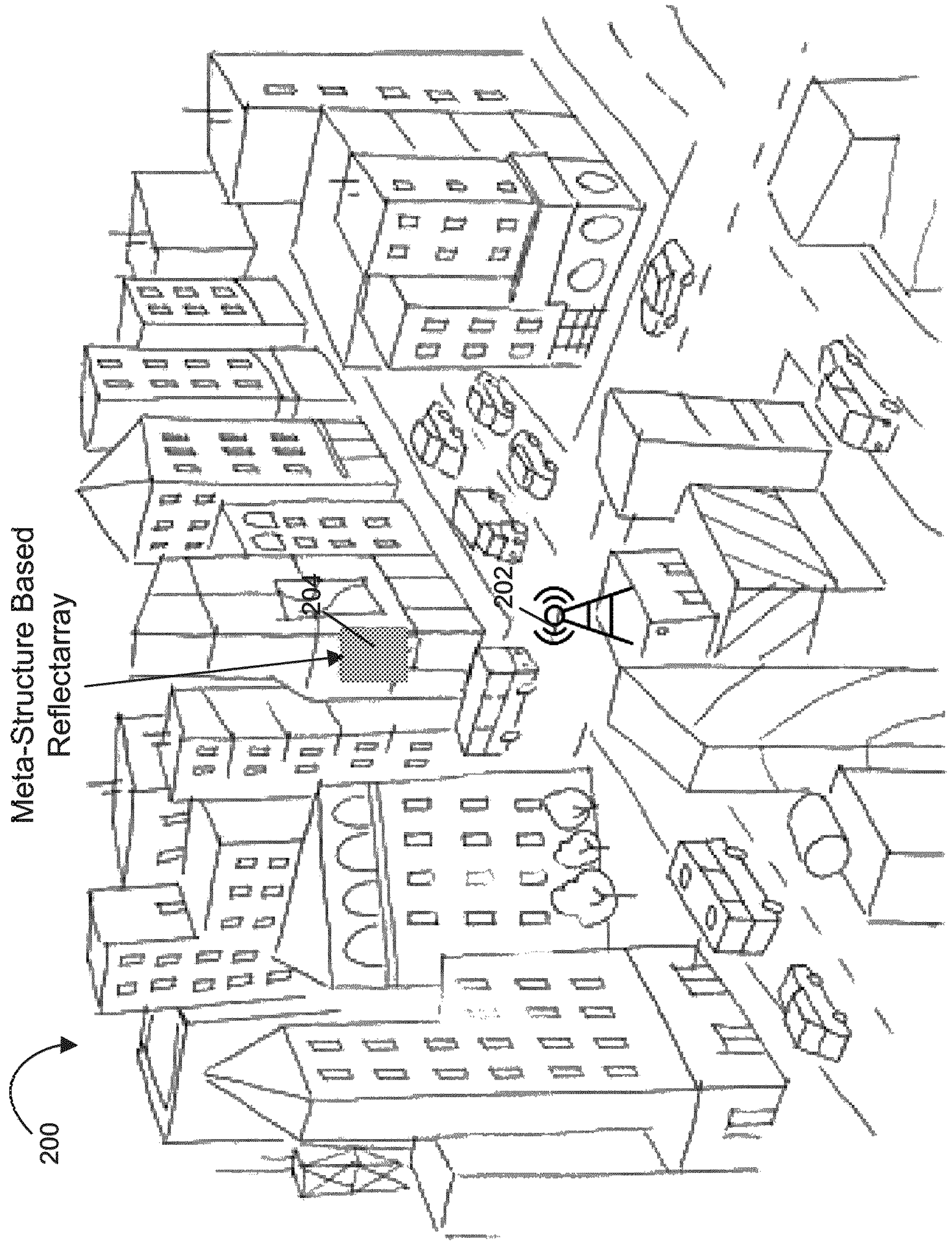
FIG. 2 illustrates a city environment in which a MTS based reflectarray is deployed for 5G applications in accordance to various examples.

FIG. 2 shows a city environment in which a MTS based reflectarray can be deployed to significantly improve 5G wireless coverage. Environment 200 is a high traffic, high density city block in which BS 202 provides wireless coverage to a large number of UE. Depending on the placement of BS 202, its wireless coverage can be optimized for UEs located in the LOS of BS 202 for a given street direction (e.g., North-South). If a UE is located in a perpendicular street direction, then that UE may suffer from diminished coverage. With the millimeter wave spectrum susceptible to environmental effects, the BS 102 may not be able to provide the same wireless performance in all directions. Use of a MTS based reflectarray 204 solves this problem, as RF signals from BS 202 can reflected off of reflectarray 204 to NLOS directions or directions in which wireless coverage and performance are affected by the dense conditions of environment 200.

Figure 3:
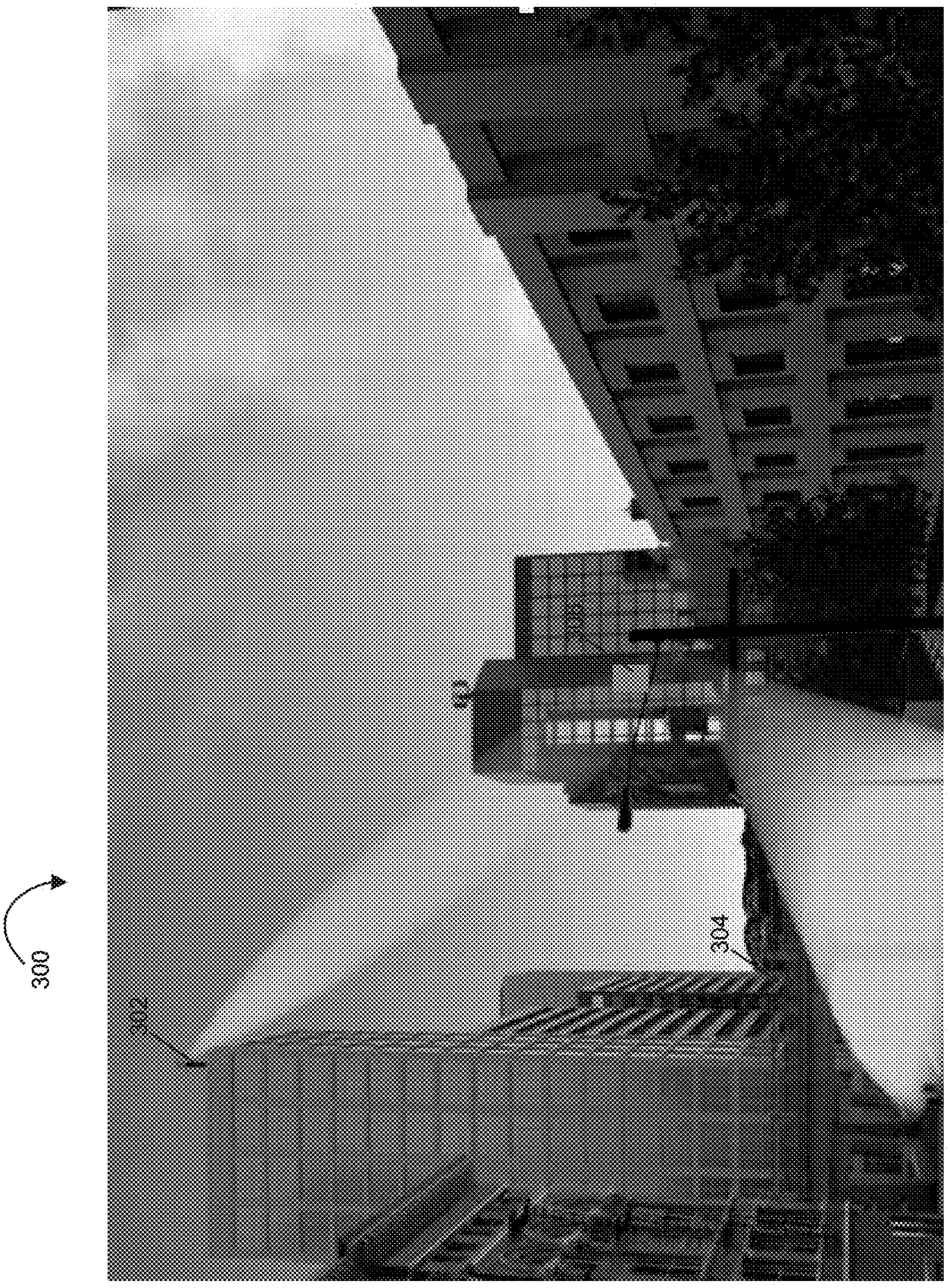
FIG. 3 illustrates another environment in which a MTS based reflectarray can be deployed to significantly improve 5G wireless coverage and performance in accordance to various examples.

FIG. 3 shows another environment in which a MTS based reflectarray can be deployed to significantly improve 5G wireless coverage and performance. In environment 300, BS 302 is located on top of a building that makes it difficult for it to provide good wireless coverage and performance to UE within its reach, including UE that may be located in NLOS areas underneath bridge 304. For those UE and others in environment 300, MTS reflectarray 304 achieves a significant performance and coverage boost by reflecting RF signals from BS 302 to strategic directions. The design of the reflectarray 304 and the determination of the directions it needs to reach for wireless coverage and performance improvements take into account the geometrical configurations of the environment 300 (e.g., placement of BS 302, distance relative to reflectarray 304, etc.) as well as link budget calculations from BS 302 to reflectarray 304 in environment 300, as described in more detail hereinbelow.

Figure 4:
FIG. 4 illustrates placement of MTS reflectarrays in an indoor set up according to various examples.

Note that MTS reflectarrays can be placed in both outdoor and indoor environments. FIG. 4 illustrates placement of MTS reflectarrays in an indoor set up according to various examples. Room 400 has a wireless radio 402 placed in one of its corners. Radio 402 provides wireless coverage to UE in room 400, such as within a fixed wireless network. There may be any number of UE in room 400 at any given time with a high demand for high speed data communications. Placement of MTS reflectarrays 404-406 in pre-determined locations enables RF waves from radio 402 to reach any direction and provide a performance boost. The performance boost achieved by the MTS based reflectarrays 404-406 is due to the constructive effect of the directed beams reflected from all its cells and their MTS reflector elements. Note that the constructive effect is achieved with a passive (or active), low cost and easy to manufacture reflectarray that is crucial for enabling 5G applications. In addition to many configurations, the reflectarrays disclosed herein are able to generate narrow or broad beams as desired, e.g., narrow in azimuth and broad in elevation, at different frequencies (e.g., single, dual, multi-band or broadband), with different materials, and so forth. The reflectarrays can reach a wide range of directions and locations in any 5G or other wireless environment. These reflectarrays are low cost, easy to manufacture and set up, and may be self-calibrated without requiring manual adjustment to its operation.

Figure 5:
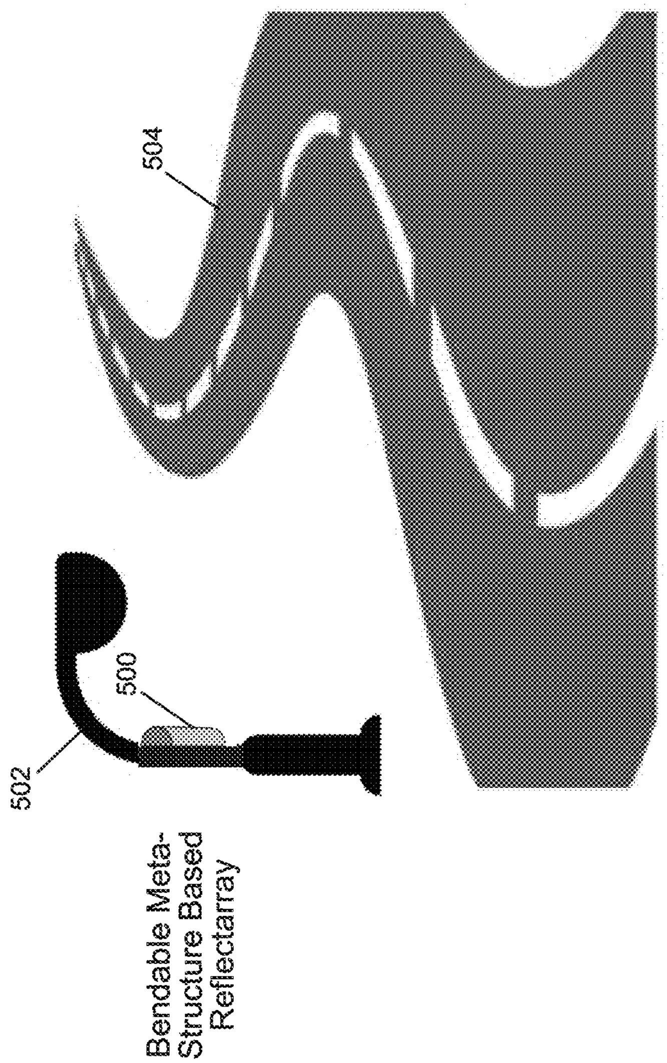
FIG. 5 illustrates a 5G application in which a MTS reflectarray is used to improve wireless coverage and performance in accordance to various examples.
Figure 13:
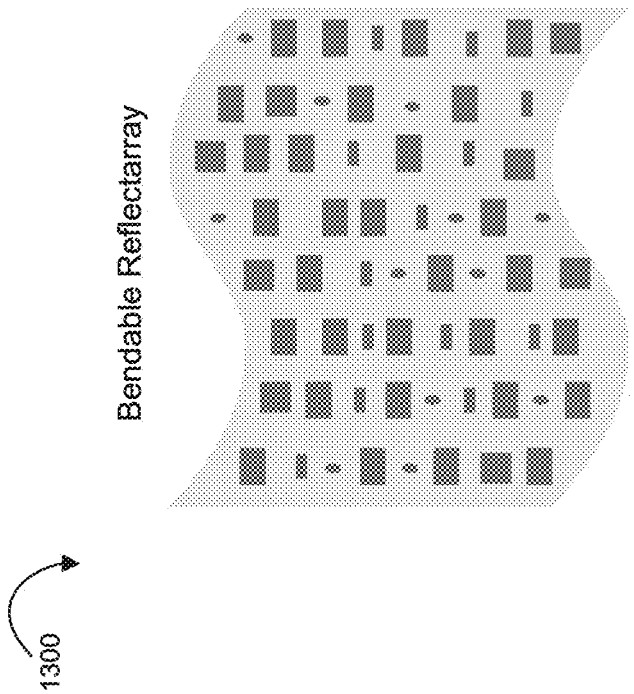
FIG. 13 illustrates a bendable reflectarray in accordance with various examples.

In one example application shown in FIG. 5, a reflectarray 500 is mounted to a post 502 or other such structure near a highway or road 504 to provide improved wireless coverage and 5G performance to UE in vehicles navigating the road. In this application, the reflectarray 500 can be a flat rectangular (or other shape) panel mounted to the post or a bendable reflectarray that can conform its shape to a non-planar surface, such as curve around a post, as also seen in FIG. 13.

Figure 6:
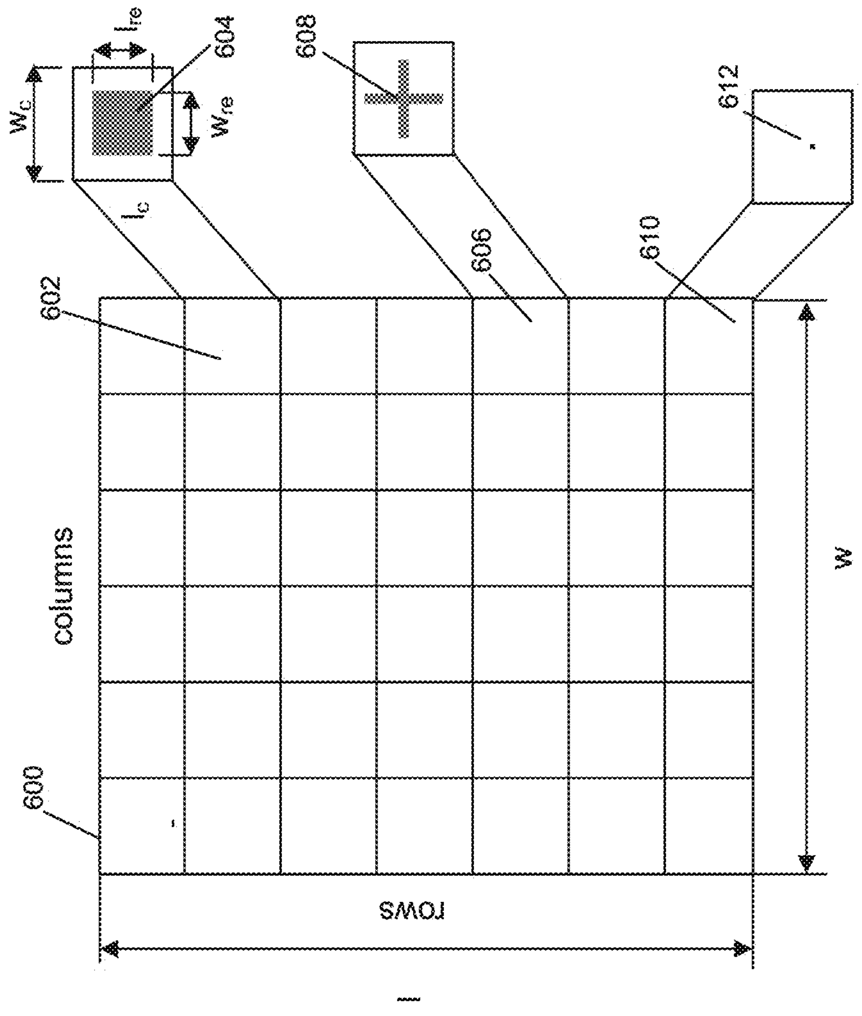
FIG. 6 is a schematic diagram of a MTS reflectarray and its cell configuration in accordance to various examples.

Attention is now directed to FIG. 6, which shows a schematic diagram of a MTS reflectarray and its cell configuration in accordance to various examples. Reflectarray 600 is an array of cells organized in rows and columns. The reflectarray 600 may be passive or active. A passive reflectarray does not require electronics or other controls, as once in position it directs incident beams into a specific direction or directions. To change the direction(s) may require repositioning the entire reflectarray, which can be achieved by means of mechanical or electronically controlled rotating mounts on the back of the reflectarray 600, as shown for example, in FIGS. 8-11. The reflectarray 600 provides directivity and high bandwidth and gain due to the size and configuration of its individual cells and the individual reflector elements within those cells.

In various examples, the cells in the reflectarray 600 are MTS cells with MTS reflector elements. In other examples, the reflectarray cells may be composed of microstrips, gaps, patches, and so forth. Various configurations, shapes, and dimensions may be used to implement specific designs and meet specific constraints. As illustrated, reflectarray 600 may be a rectangular reflectarray with a length l and a width w. Other shapes (e.g., trapezoid, hexagon, etc.) may also be designed to satisfy design criteria for a given 5G application, such as the location of the reflectarray relative to a wireless radio, the desired gain and directivity performance, and so on. In some implementations, each cell in the array of cells of the reflectarray 600 includes a reflector element with a predetermined custom configuration, in which the predetermined custom configuration corresponds to a rectangular shape, a square shape, a trapezoid shape, a hexagon shape, or a cross shape. In this respect, the reflector elements may have different configurations, such as a square reflector element, a rectangular reflector element, a dipole reflector element, a miniaturized reflector element, and so on. In some implementations, at least two cells in the array of cells have reflector elements with different layout configurations. For example, a first cell may have a rectangular shape and a second cell may have a square shape.

Figure 7:
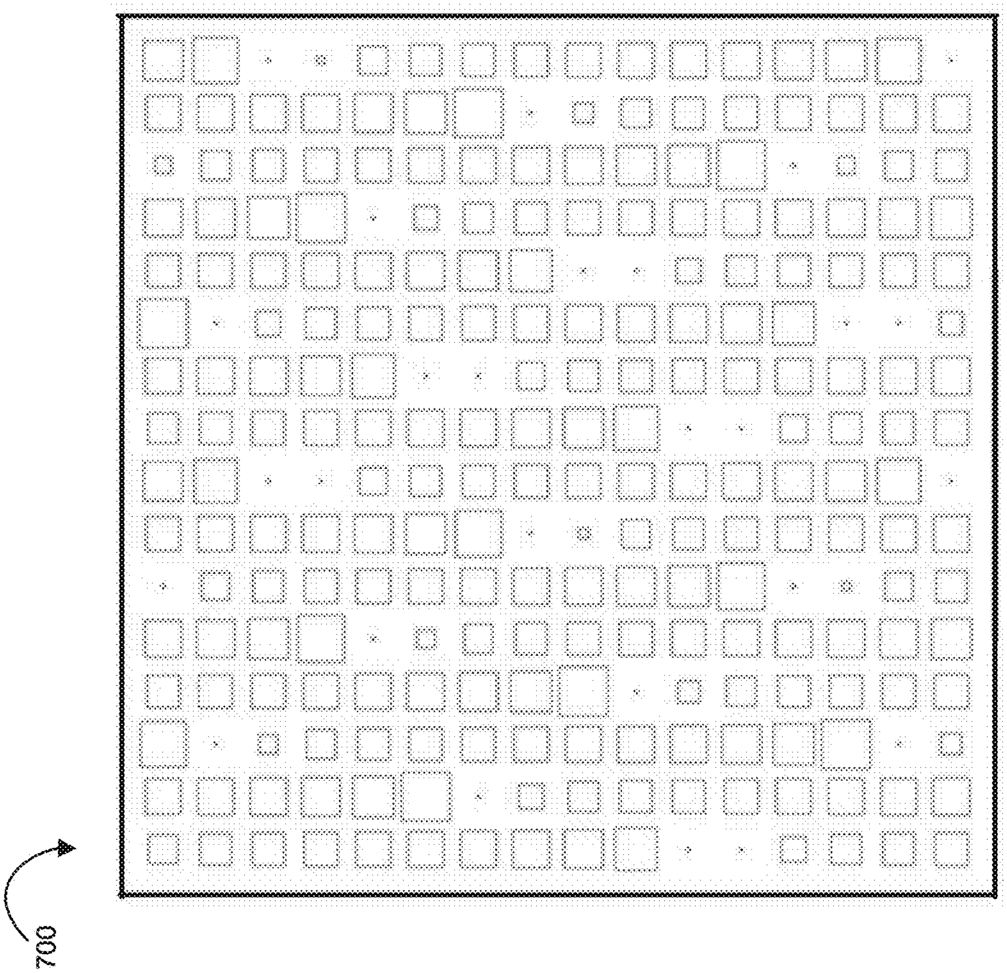
FIG. 7 is an example reflectarray with a variety of cell configurations.

In some implementations, the reflector element has dimensions different from that of the cell. For example, cell 602 is a rectangular cell of dimensions $w_c$ and $l_c$ for its width and length, respectively. Within cell 602 is a MTS reflector element 604 of dimensions $w_{re}$ and $l_{re}$. As a MTS reflector element, its dimensions are in the sub-wavelength range ($\sim\lambda/3$), with $\lambda$ indicating the wavelength of its incident or reflected RF signals. In some implementations, at least two cells in the array of cells comprise different types of reflector elements. For example, cell 606 includes a dipole element 608 and cell 610 includes a miniaturized reflector element 612 that has the smallest dimensions than that of other types of reflector elements in the cells in the reflectarray 600. The miniaturized reflector element 612 may effectively be a significantly small dot in an etched or patterned printed circuit board ("PCB") metal layer that may be imperceptible to the human eye. As described in more detail below, the design of the reflectarray 600 is driven by geometrical and link budget considerations for a given application or deployment, whether indoors or outdoors. The dimensions, shape and cell configuration of the reflectarray 600 will therefore depend on the particular application. Each cell in the reflectarray 600 may have a different reflector element, as illustrated with the reflectarray 700 shown in FIG. 7.

Figure 8:
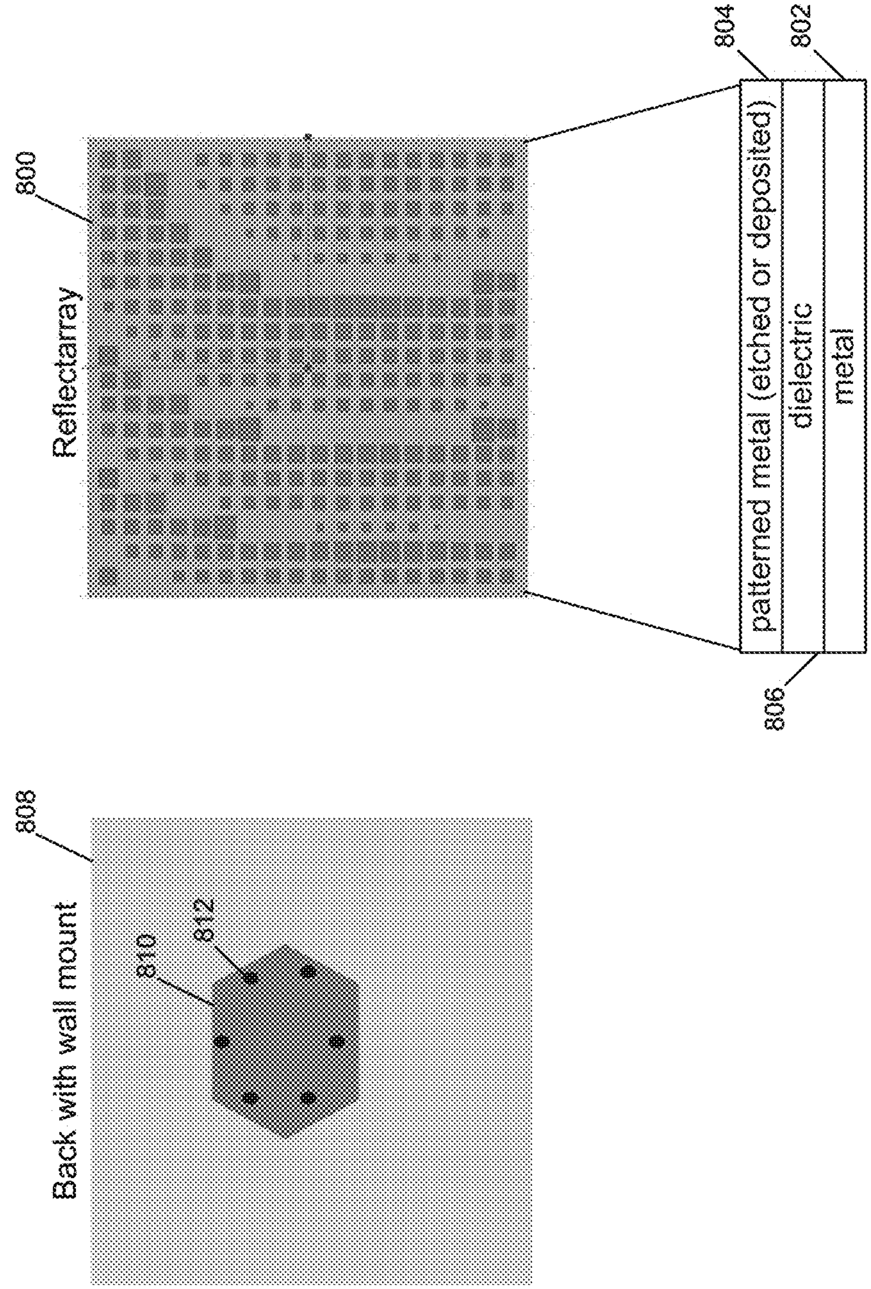
FIG. 8 illustrates a reflectarray with a wall mount in its back surface in accordance with various examples.

FIG. 8 illustrates a reflectarray with a wall mount in its back surface in accordance with various examples. Reflectarray 800 has high manufacturability as it can be made of low cost PCB materials suitable for high frequency operation. As illustrated, reflectarray 800 has a ground conductive plane 802 and a patterned conductive plane 804 surrounding a dielectric substrate 806. In some aspects, the dielectric substrate is interposed between the patterned conductive plane 804 and the ground conductive plane 802. The reflector elements of the reflectarray 800 can be etched or deposited into a metal material to form the patterned conductive plane 804. In various examples, the ground conductive plane 802 and the patterned conductive plane 804 are copper layers surrounding a composite dielectric material. Other materials may be used to design the reflectarray 800, depending on the desired performance of a given 5G or other wireless application. A mounting plane 808 can coupled to a first surface (e.g., back surface) of the ground conductive plane 802 of reflectarray 800 to provide a mount 810 for a wall or other like surface. The mounting plane 808 with the mount 810 may be non-permanently fastened to a surface (e.g., a wall) via one or more fasteners, such as screws 812.

Figure 9:
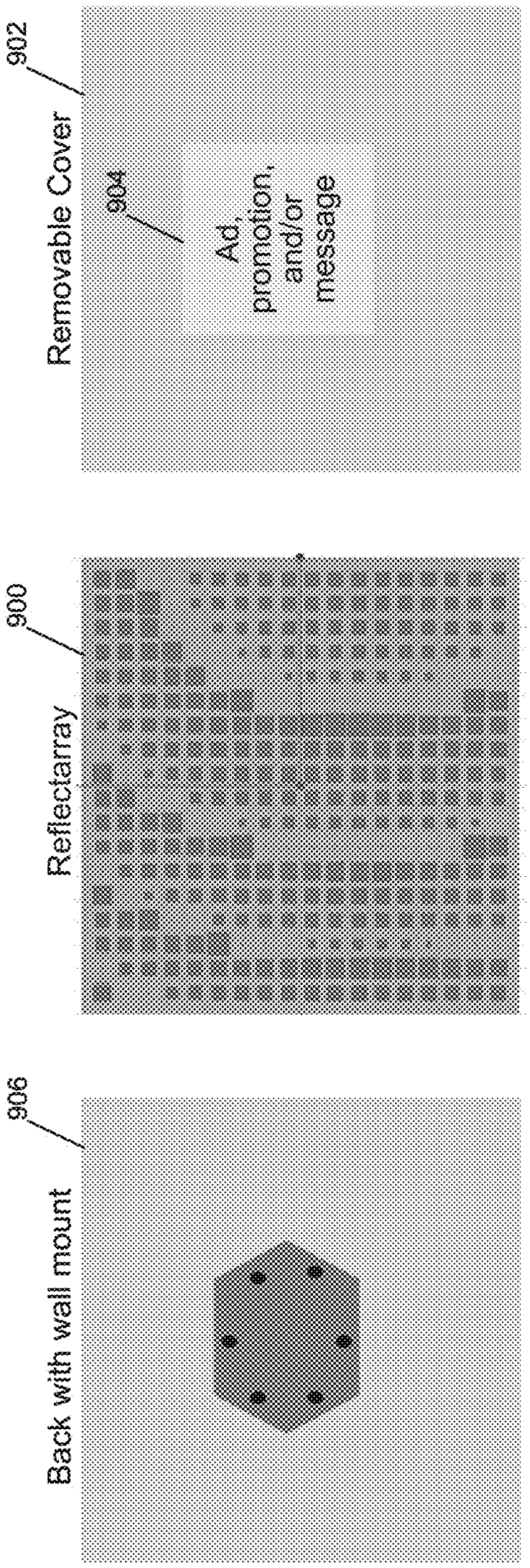
FIG. 9 illustrates a reflectarray with a removable cover in accordance with various examples.

In various examples, a removable cover may be placed on top of the reflectarray as desired by the application. As shown in FIG. 9, reflectarray 900 has a removable cover 902 that is non-permanently coupled to a patterned conductive plane (e.g., 804) and may be positioned on top of the reflectarray by various means, such as by glue, silk screening, or other such means. Care must be taken during the design process of the reflectarray 900 to select appropriate cover materials that will not interfere with the directivity performance of the reflected RF signals, e.g., fiberglass or other such materials. In various examples, the reflectarray 900 can be designed and simulated with the removable cover 902 to ensure that the reflectarray cells and their reflector elements will provide the desired performance. The removable cover 902 may serve a dual purpose to protect the reflectarray 900 from environmental or other damage to its surface and to enable 5G providers, emergency response systems, and others to show messages (e.g., a message associated with roadway navigation), advertisements or promotions in the reflectarray 900 that are viewable by UE within its vicinity. There may be various configurations of cover 902 that enable ads and messages to be relayed from the reflectarray 900 mounted to a surface via back mount 906.

Figure 10:
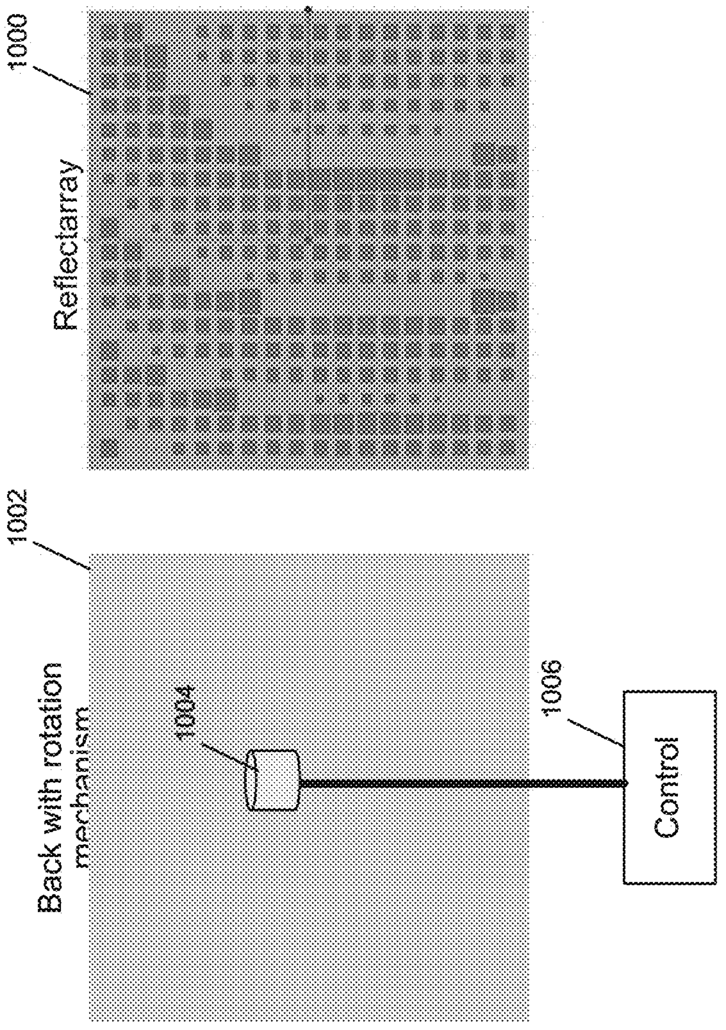
FIG. 10 illustrates a reflectarray with a rotation mechanism placed on its back surface in accordance to various examples.
Figure 11:
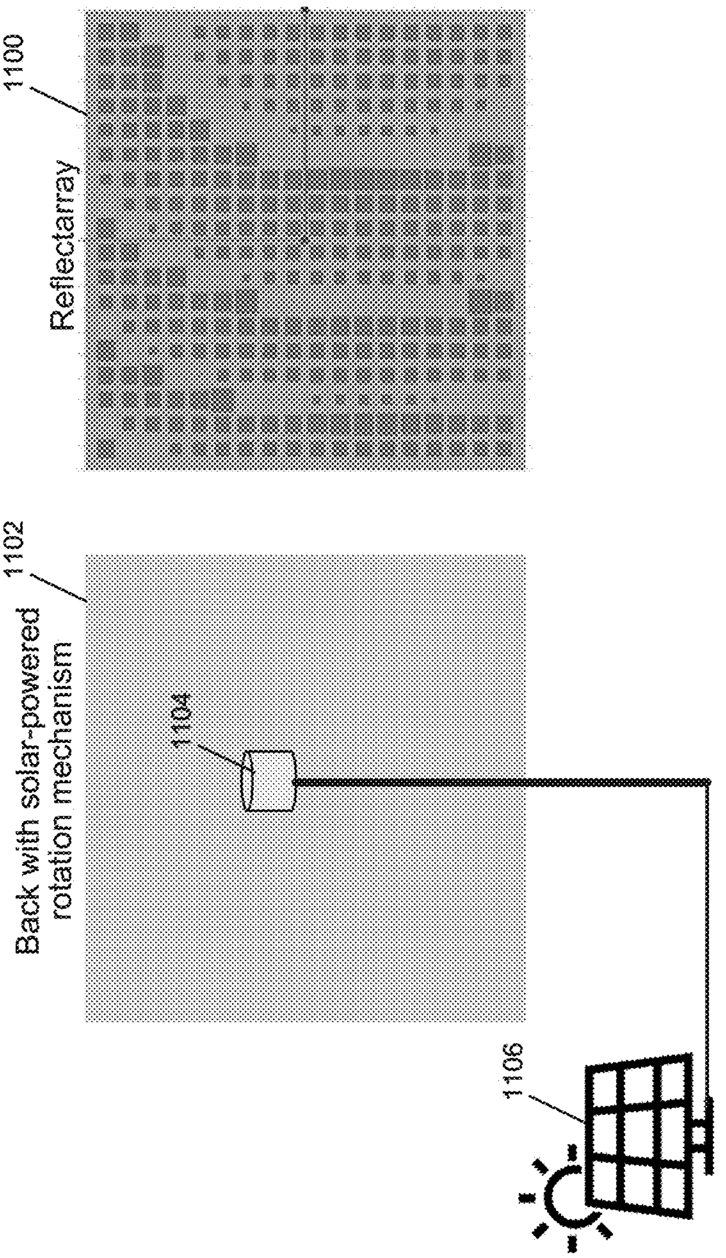
FIG. 11 illustrates a reflectarray with a solar controlled rotation mechanism placed on its back surface in accordance to various examples.

Note that there may be various applications that may require the reflectarray to change its position without having to place another reflectarray in the environment. FIG. 10 illustrates an example reflectarray 1000 that has a rotation mechanism 1004 placed on its back surface 1002 that may be mountable to a wall or other such surface. The rotating mechanism 1004 may be controllable by control circuit 1006 to change the orientation of the reflectarray 1000 as desired. The rotation mechanism can also be controlled by other means other than control circuitry 1006, such as, for example, a solar cell. FIG. 11 illustrates such a reflectarray 1100 in which a rotating mechanism 1104 on back surface 1102 is controlled by solar cell 1106.

Figure 12:
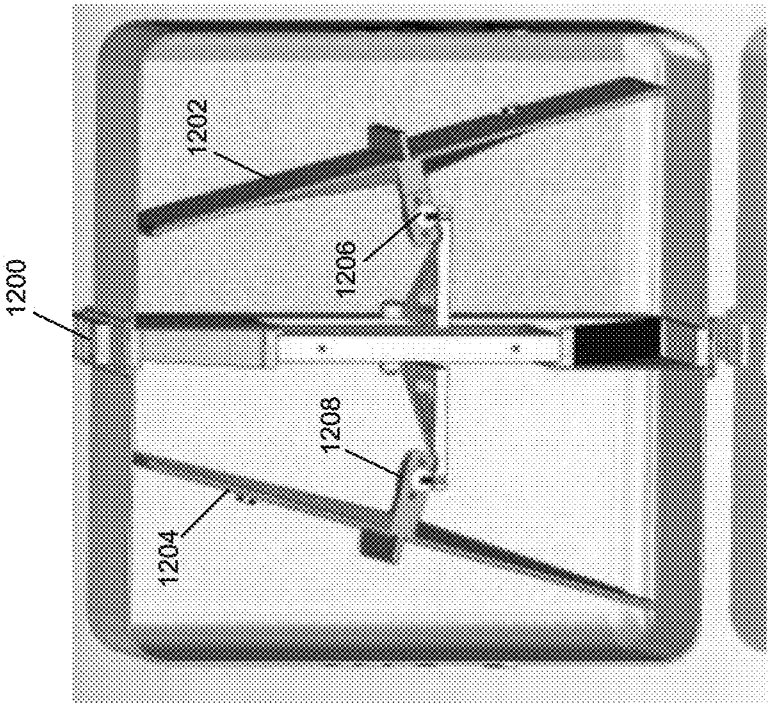
FIG. 12 illustrates a dual reflectarray on a rotating mount in accordance with various examples.

Other configurations of rotating reflectarrays may be implemented as desired. FIG. 12 illustrates an example of a dual reflectarray on a rotating mount. Structure 1200 is designed to support two reflectarrays: reflectarray 1202 and reflectarray 1204. These reflectarrays can be rotated to different orientations by rotating levers 1206 and 1208, respectively. In one example, reflectarray 1202 has a horizontal orientation and reflectarray 1204 has a vertical orientation. Their orientations can be changed as needed by the respective 5G or other wireless application.

An even more flexible reflectarray in terms of its configuration and placement capabilities is illustrated in FIG. 13. Reflectarray 1300 is a bendable reflectarray that is manufactured of a bendable and flexible PCB material for applications such as that illustrated in FIG. 5, when a bendable reflectarray is shown mounted to a light post near a highway to provide improved wireless coverage and performance to UEs in vehicles navigating the highway. In some implementations, the reflectarray 1300 includes a patterned conductive plane, a ground conductive plane and a dielectric substrate that each includes a bendable PCB material that allows the reflectarray 1300 to conform its shape to a non-planar surface when mounted to the non-planar surface.

Figure 14:
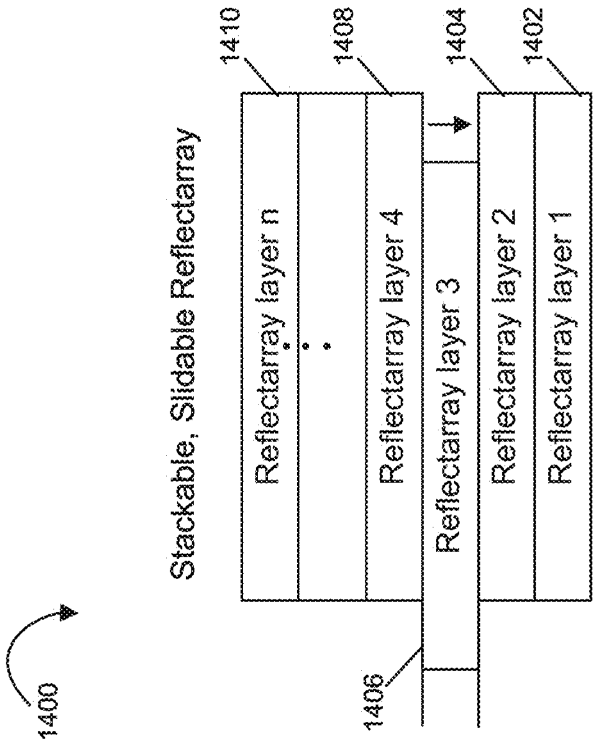
FIG. 14 is a schematic diagram of a stackable, slidable reflectarray having multiple reflectarray layers in accordance to various examples.

FIG. 14 shows a stackable, slidable reflectarray in accordance to various examples. Reflectarray 1400 is a stackable structure having multiple reflectarray layers. Each reflectarray layer, e.g., reflectarray layers 1402-1410, is designed according to its placement in the stack. The stack may be changed as desired by the application, so that at any given time a network operator may remove a reflectarray layer from the stack, e.g., reflectarray layer 1406, while the other reflectarray layers stay in their place or are moved to accommodate the displacement of the reflectarray layer that was removed. Note that this design configuration of reflectarray 1400 enables many different wireless applications to take advantage of the capabilities of reflectarrays to provide high gain to specific directions. The stackable structure of reflectarray 1400 allows 5G network operators to select from a library or catalog of already manufactured reflectarrays to satisfy different design criteria. Similarly, a library or catalog of removable covers may be used with a single or stackable reflectarray. Note that the materials of the reflectarray layers 1402-1410 are selected such that RF signals are able to be reflected according to the design criteria. In various examples, a given layer may be a transparent layer able to reflect signals at a given frequency. Each reflectarray layer in the stack may be designed to reflect signals at a different frequency.

Figure 15:
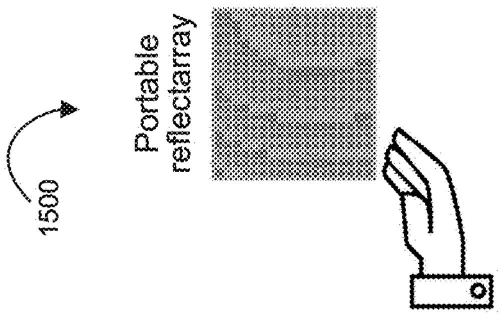
FIG. 15 illustrates a portable reflectarray in accordance to various examples.

Another configuration for a reflectarray is shown in FIG. 15, which illustrates a portable reflectarray 1500 that may be easily transported within a wireless network as desired. The portable reflectarray 1500 may be selected from a library of reflectarrays to achieve a particular need within a 5G network or wireless application. The portable reflectarray 1500 may also be a portable stackable reflectarray as shown in FIG. 14, or have a removable cover as shown in FIG. 9 that is selected from a catalog of covers. The removable cover may be used to display an ad, promotion or message within the 5G network. The portable reflectarray 1500 is easily transportable and may be mounted to a wall or other surface as needed.

Figure 16:
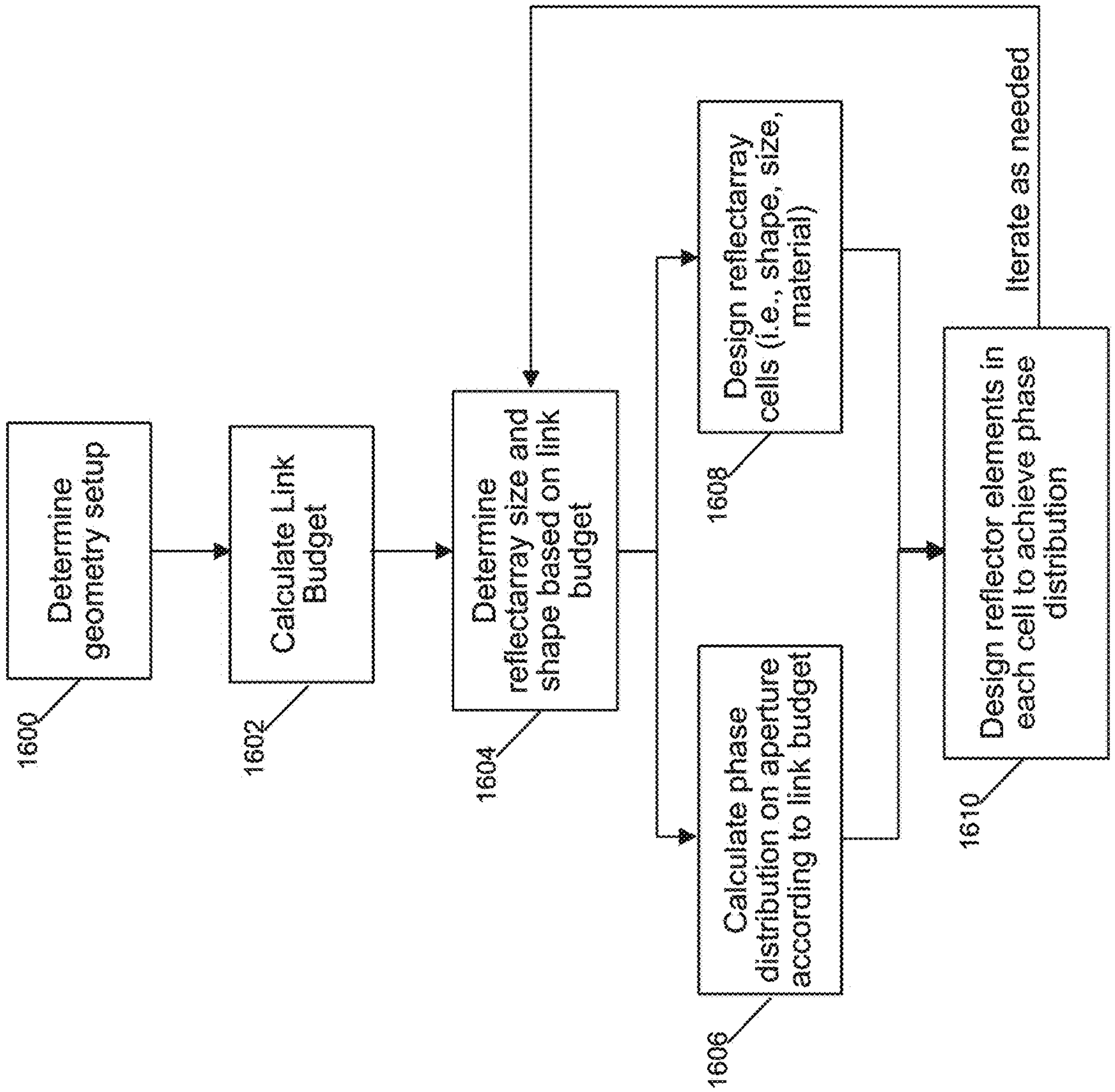
FIG. 16 is a flowchart for designing a reflectarray according to the various examples disclosed herein.
Figure 17:
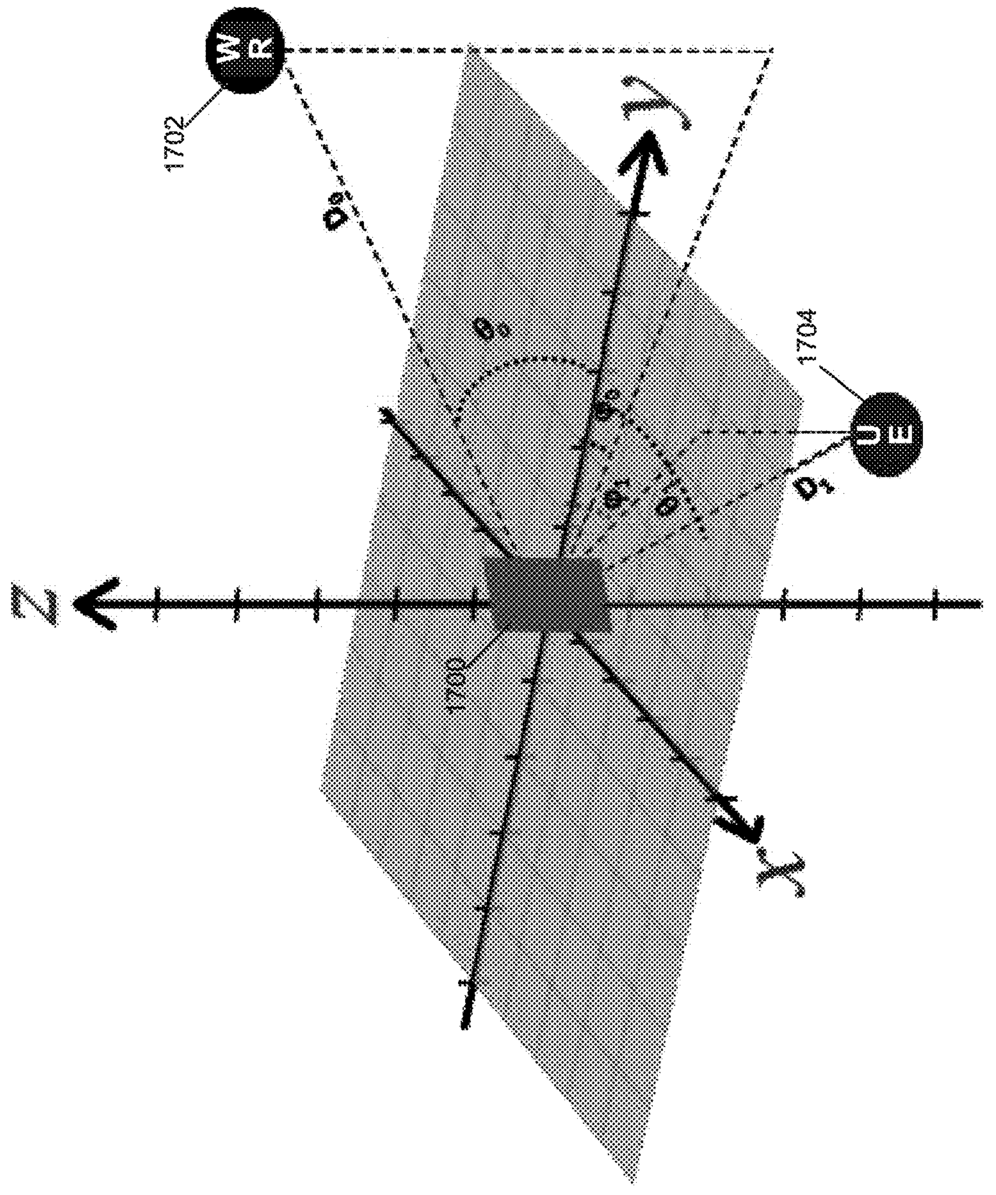
FIG. 17 illustrates a geometrical setup for a reflectarray in accordance to various examples.

Attention is now directed to FIG. 16, which shows a flowchart for designing a reflectarray according to the various examples disclosed herein. The first step in the design process is to determine the geometry configuration between a reflectarray antenna and a wireless radio for a desired wireless application (1600). This involves determining the position of the BS or wireless radio that provides the incident RF signals to be reflected off the reflectarray, including its distance from the reflectarray, and the orientation and position of the reflectarray itself. The geometry setup can be seen in FIG. 17, which shows a wireless radio ("WR") 1702 located at $D_0$ from a Cartesian (x, y, z) coordinate system positioned in the center of the reflectarray 1700. The reflectarray 1700 is positioned along the x-axis with the y-axis indicating its boresight. The WR 1702 has an elevation angle $\theta_0$ and an azimuth angle $\varphi_0$. Note that determining the geometry setup is a simple procedure involving simple geometrical tools such as, for example, a laser distance measurer and an angles measurer. This highlights the ease of setup of reflectarray 1700 and further incentivizes its use when its significant wireless coverage and performance improvements are achieved at low cost with a highly manufacturable reflectarray that can be easily deployed in any 5G or wireless environment, whether indoors or outdoors.

Figure 18:
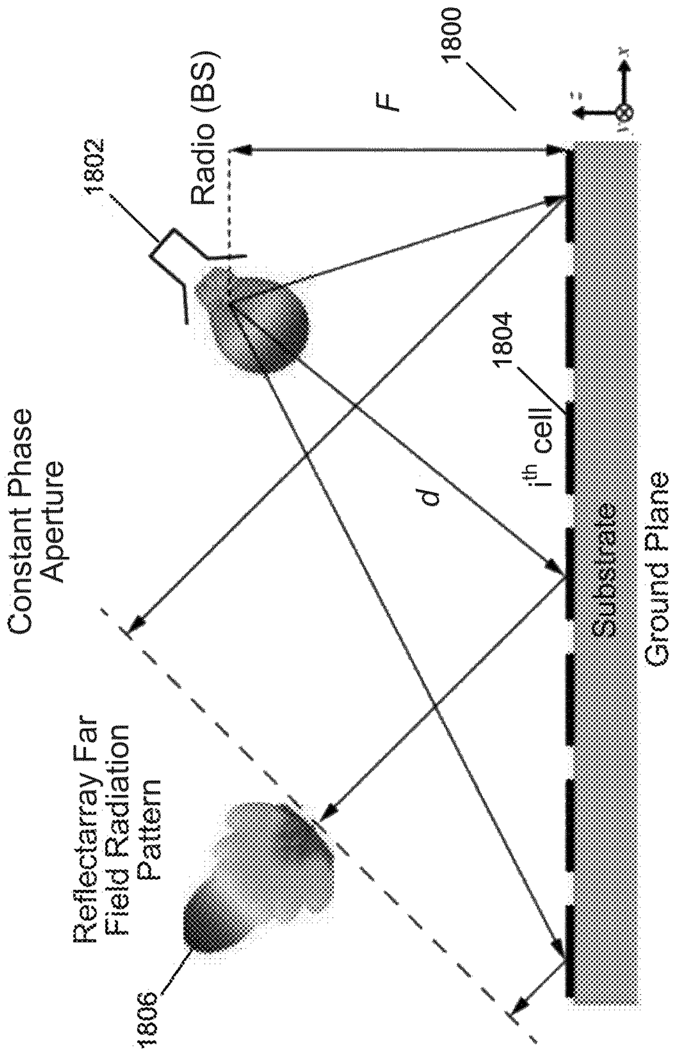
FIG. 18 illustrates a radiation pattern from a reflectarray in accordance to various examples.

The reflectarray 1700 can be used to reflect RF waves from WR 1702 into UE within the 5G network served by WR 1702, such as, for example, UE 1704 located at a distance $D_1$ from the reflectarray 1700 with $\theta_1$ elevation and $\varphi_1$ azimuth angles. FIG. 18 illustrates a far field radiation pattern 1806 that is generated from reflectarray 1800 having a ground conductive plane, a dielectric substrate and a patterned conductive plane with the reflectarray cells having reflector elements, e.g., MTS reflector elements. As illustrated, BS 1802 sends RF signals to reflectarray 1800 from a distance d to $i^{th}$ cell 1804. Those RF signals are then reflected from each cell in reflectarray 1800 with RF beams. The constructive behavior of the RF beams from all cells in reflectarray 1800 is effectively an antenna gain that results in significant improvements in wireless coverage and performance to UEs receiving the radiation pattern 1806.

Returning to FIG. 16, once the geometry setup is determined, the next step is to calculate a link budget for a signal transmission between the reflectarray antenna (e.g., reflectarray 1700) and the wireless radio (e.g., WR 1702) based at least on the geometry configuration for the wireless application (1602). The link budget is a calculation that takes as inputs parameters identifying the gain profile of the BS (e.g., WR 1702) such as, for example, its center frequency, bandwidth, Tx power (EIRP), antenna gain (beam-width), polarization, Rx sensitivity, and location ($D_0$, $\theta_0$, $\varphi_0$), and parameters or gain profile of an UE within reach of the BS (e.g., UE 1704) such as, for example, its Tx power (EIRP), antenna gain (beam-width), polarization, Rx sensitivity, and location ($D_1$, $\theta_1$, $\varphi_1$). The output of the link budget calculation determines a custom type, shape and dimensions of the reflectarray, as well as its expected gain, beam-width and location in terms of azimuth and elevation angles for both uplink and downlink communications (1604).

Once the custom type, shape and dimensions of the reflectarray are determined according to the link budget, the next two steps can be performed sequentially or in parallel: the phase distribution on the reflectarray aperture is determined according to the link budget (1606) and the reflectarray cells are designed, i.e., their shape, size, and material are selected (1608). The reflection phase, $\varphi_r$, for an $i^{th}$ cell in the reflectarray (e.g., cell 1804 in reflectarray 1800) is calculated as follows:

$$\varphi_r = k_0(d_i - (x_i \cos\varphi_0 + y_i \sin\varphi_0)\sin\theta_0) \pm 2N\pi \quad \text{(Eq. 1)}$$

wherein $k_0$ is the free space propagation constant, $d_i$ is the distance from the BS to the $i^{th}$ cell in the reflectarray, N is an integer for phase wrapping, and $\varphi_0$ and $\theta_0$ are the azimuth and elevation angles for the target reflection point. The calculation identifies a desired or required reflection phase $\varphi_r$ by the $i^{th}$ element on the x-y plane to point a focused beam to ($\varphi_0$,$\theta_0$). $d_i$, is the distance from the phase center of the BS to the center of the $i^{th}$ cell, and N is an integer. This formula and equation may further include weights to adapt and adjust specific cells or sets of cells. In some examples, a reflectarray may include multiple subarrays allowing redirection of a received signal in more than one direction, frequency, and so forth.

Figure 19:
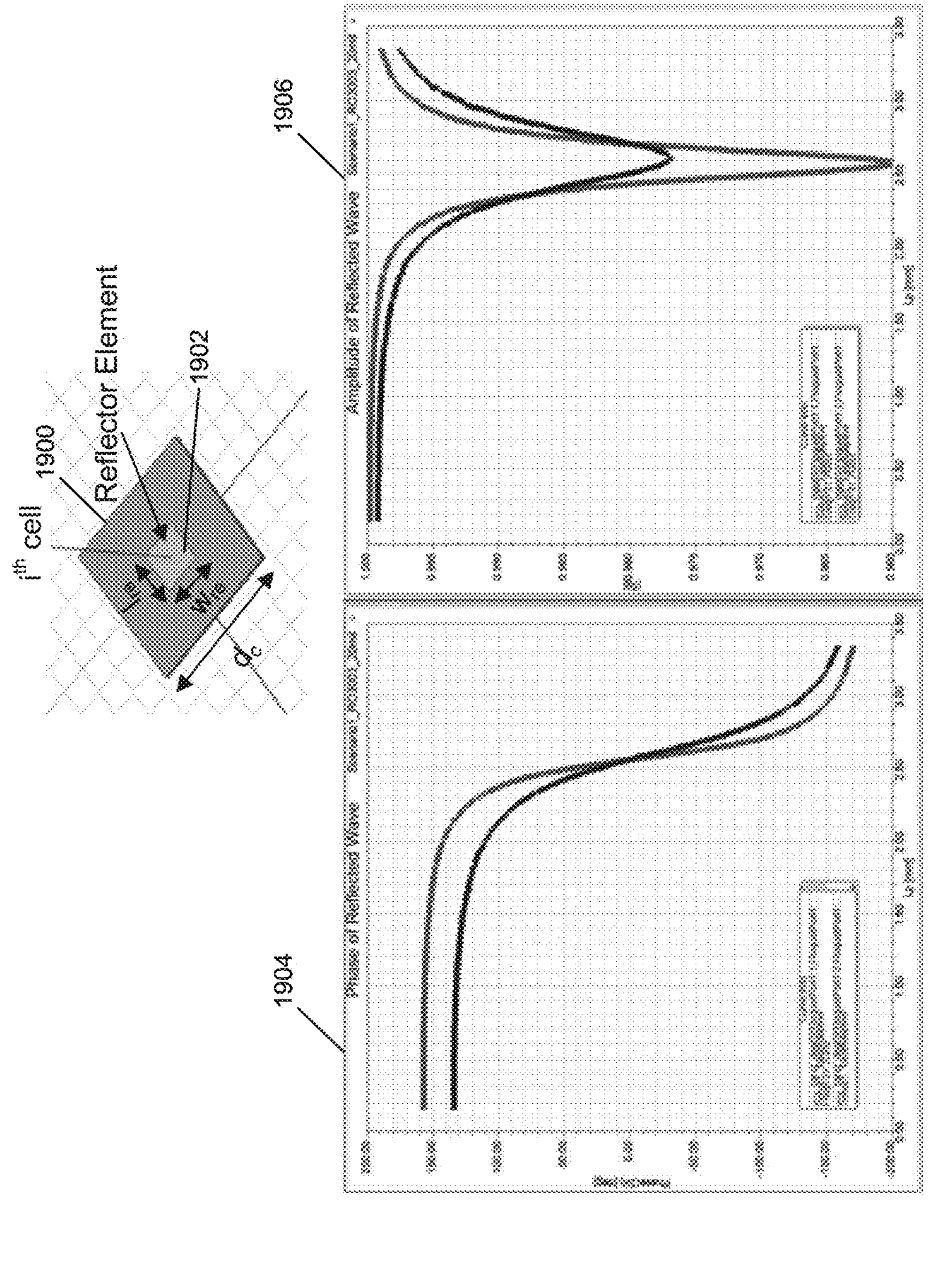
FIG. 19 illustrates a reflectarray cell and its phase and amplitude distribution according to various examples.

The last step in the design process is to then design the reflector elements in each cell (e.g., custom type, shape and dimensions in a sub-wavelength range) to achieve the phase distribution on the reflectarray aperture (1610). For example, the reflector elements in each cell include a reflection phase that corresponds to the phase distribution. The design process steps 1604-1610 may be iterated as needed to adjust parameters such as by weighting some of the cells, adding a tapering formulation, and so forth. FIG. 19 illustrates a reflectarray cell 1900 with a reflector element 1902, e.g., a customized MTS reflector element, to achieve the phase and amplitude distribution illustrated in graphs 1904 and 1906, respectively.

Figure 20:
FIG. 20 illustrates a library of reflectarrays and a library of removable covers according to various examples.

Once the reflectarray is designed, it is ready for placement and operation to significantly boost the wireless coverage and performance of any 5G or wireless application, whether indoors or outdoors. Note that even after the design is completed and the reflectarray is manufactured and placed in an environment to enable high performance 5G applications, the reflectarray can still be adjusted with the use of say rotation mechanisms as shown in FIGS. 10-12 or in a stackable configuration as shown in FIG. 14. The reflectarray can also be manufactured with a bendable PCB for easy placement in structures such as light posts (as shown in FIGS. 5 and 13), be made portable as in FIG. 15, or have removable cover(s) with the option to display ads, promotions or messages to UE and others in the 5G environment (as shown in FIG. 8). The 5G operators can have access to a catalog of reflectarrays 2000 and covers 20002 as illustrated in FIG. 20, or they can request custom made designs of reflectarrays and covers if desired. In addition to many configurations, the reflectarrays disclosed herein are able to generate narrow or broad beams as desired, e.g., narrow in azimuth and broad in elevation, at different frequencies (e.g., single, dual, multi-band or broadband), with different materials, and so forth. The reflectarrays can reach a wide range of directions and locations in any 5G environment. These reflectarrays are low cost, easy to manufacture and set up, and may be self-calibrated without requiring a 5G or wireless network operator to adjust its operation. They may be passive or active and achieve MIMO like gains and enrich the multipath environment. It is appreciated that these reflectarrays effectively enable the desired performance and high-speed data communications promises of 5G and future wireless communication standards.

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein.

What is claimed is:

1. A reflectarray for use in a millimeter wave wireless communication system, the reflectarray comprising:

an array of cells configured in a patterned conductive layer disposed on top of a dielectric substrate, each cell of the array of cells comprising a meta-structure (MTS) reflector element, wherein at least one cell of the array of cells comprises a hexagonal reflector element, at least one cell of the array of cells comprises a rectangular reflector element, at least one cell of the array of cells comprises a dipole reflector element; and a removable cover that is non-permanently coupled to the patterned conductive layer.

2. The reflectarray of claim 1, wherein the customized MTS reflector element in each cell comprises a type, shape and dimensions based at least on a link budget.

3. The reflectarray of claim 1, further comprising the MTS reflector element having dimensions in a subwavelength range of the millimeter wave wireless communication system.

4. The reflectarray of claim 1, further comprising:

a mounting plane coupled to a first surface of a ground conductive plane, the ground conductive plane having a second surface coupled to the dielectric substrate, wherein the mounting plane of the reflectarray is non-permanently fastened to a surface via one or more fasteners.

5. The reflectarray of claim 4, further comprising: a rotation unit coupled to the mounting plane and configured to adjust an orientation of the reflectarray in one or more directions.

6. The reflectarray of claim 5, wherein the rotation unit is powered and controlled by a control circuit coupled to the rotation unit or a solar cell coupled to the rotation unit.

7. The reflectarray of claim 6, wherein each of the patterned conductive layer, the ground conductive plane and the dielectric substrate includes a bendable printed circuit board material that allows the reflectarray to conform its shape to a nonplanar surface when mounted to the nonplanar surface.

8. The reflectarray of claim 1, wherein the removable cover includes content on an outer surface of the cover, the content comprising one or more of a message associated with roadway navigation or an advertisement.

9. The reflectarray of claim 1, wherein the patterned conductive layer comprises a plurality of subarrays configured to redirect the received RF signal in respective ones of a plurality of directions.

10. A stackable reflectarray structure comprising a plurality of stackable reflectarrays having at least one layer of removable reflectarrays, wherein the plurality of stackable reflectarrays comprises the reflectarray of claim 1.

11. The reflectarray of claim 1, further comprising a configuration of the array of cells such that incident signals are reflected to a given area, wherein the given area is a non-lineof-sight (NLOS) area.

* * * * *